Jan. 20, 1970 C. D. HENNING ET AL 3,491,318
BASEBALL SEAM MAGNET WITH VARIABLE MAGNETIC FIELD
Filed Aug. 16, 1968 3 Sheets-Sheet 1

INVENTORS
CARL D. HENNING
BY ANTHONY K. CHARGIN

ATTORNEY

Jan. 20, 1970 C. D. HENNING ET AL 3,491,318
BASEBALL SEAM MAGNET WITH VARIABLE MAGNETIC FIELD
Filed Aug. 16, 1968 3 Sheets-Sheet 2
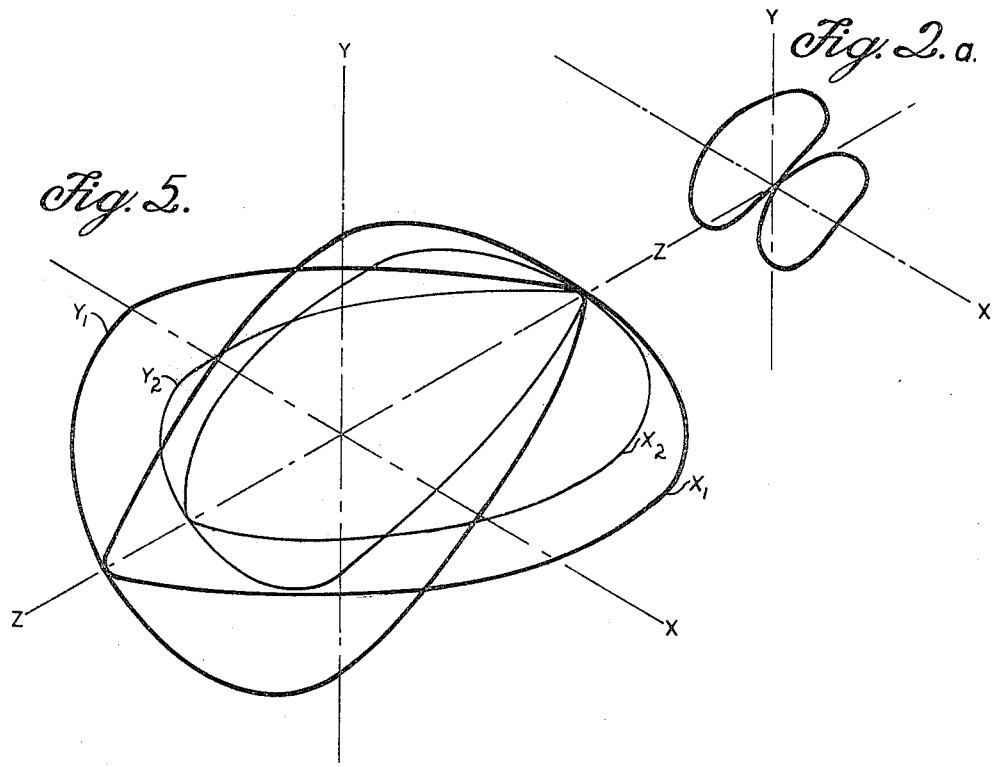
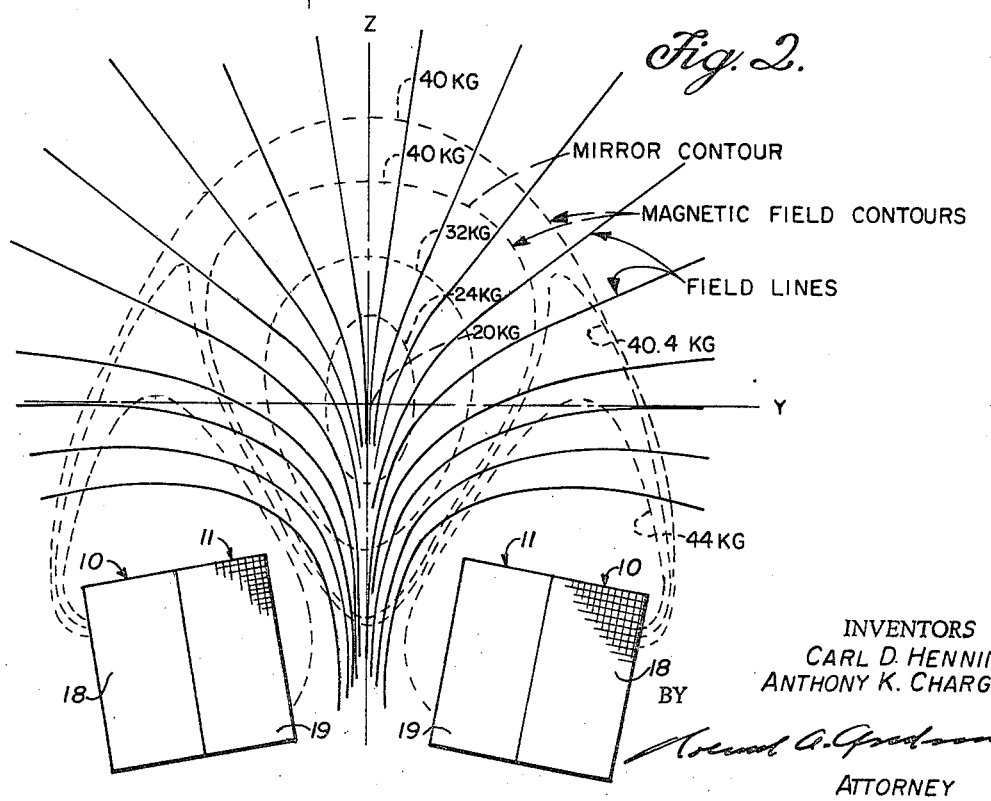
INVENTORS
CARL D. HENNING
ANTHONY K. CHARGIN
BY
ATTORNEY

United States Patent Office 3,491,318
Patented Jan. 20, 1970

3,491,318
BASEBALL SEAM MAGNET WITH VARIABLE MAGNETIC FIELD
Carl D. Henning, Livermore, and Anthony K. Chargin, San Jose, Calif., assignors to the United States of America as represented by the United States Atomic Energy Commission
Filed Aug. 16, 1968, Ser. No. 753,189
Int. Cl. H01f 5/00
U.S. Cl. 335—213                             7 Claims

ABSTRACT OF THE DISCLOSURE

An electromagnet for confining high temperature plasma comprised of more than one electrically independent, contiguous conductor coil formed in a configuration similar to the seam of a baseball. When the conductor coils are separately energized to different levels, they produce an asymmetrical, cusped magnetic field which increases in all directions away from the plasma confinement region, creating a magnetic well. The depth of the magnetic well is varied by changing the difference between the energizing levels of the conductor coils.

BACKGROUND OF THE INVENTION

The invention described herein was made under contract W-7405-Eng-48 with the United States Atomic Energy Commission.

One of the principal objectives of controlled thermonuclear research has been the stable confinement of a high temperature plasma. It has been demonstrated that a "minimum-B magnetic field" provides an especially favorable means of stable confinement of a high temperature plasma. The "minimum-B magnetic field" is a cusped field which increases in all directions away from the plasma confinement region, creating a magnetic well. The depth of the magnetic well is characterized by the mirror ratio, defined as the value of the field at the outermost magnetic field contour that closes on itself about the plasma confinement region, denoted the mirror contour, divided by the minimum central field. Several magnet configurations have been developed that will produce such a magnetic field.

One of the most common configurations that has been developed to produce a "minimum-B magnetic field" consists of a quadrupole magnetic field superimposed upon a magnetic mirror field. A more expedient prior art configuration is a single coil baseball seam magnet in which the current flows in a conductor shaped like the seam of a baseball. The baseball seam configuration has several advantages over the other configurations, including the mirror-quadruploe. The baseball seam configuration is the simplest shape that produces a "minimum-B magnetic field," and it does it in the most efficient manner, i.e., with minimum electrical power and conductor material. In addition, the baseball seam configuration produces a deep, large volume magnetic well and, because of its unique shape, the access to the interior of the magnetic well is excellent.

However, a single coil baseball seam magnet, in contrast to the mirror-quadrupole magnet, has several disadvantages. The magnetic field generated by a single coil baseball seam magnet varies linearly with the current passing through the coil such that once the magnet geometry is determined, the mirror ratio of the magnetic well is fixed. Therefore, a single coil baseball seam magnet is not a versatile magnet for confining high temperature plasma. Also, the magnetic field has an axis of symmetry that can produce resonant-frequency plasma instability during the period of plasma confinement. It has been determined that these two disadvantages could be overcome by the addition of an independent pair of circular magnets positioned such that they oppose each other across the baseball seam magnet. However, once these magnets are added, the advantages of the baseball seam configuration recited above are seriously impaired. In particular, the additional conductors complicate the total magnetic configuration and increase the costs of construction and operation of the magnet. Also, because of the additional space occupied by the separate conductors, the accessibility to the magnet interior is substantially reduced.

SUMMARY OF THE INVENTION

The apparatus of the present invention is a baseball seam magnet comprised of at least two electrically independent, contiguous conductor coils conjointly defining a configuration similar to the seam of a baseball and approximating a continuous line on the surface of a sphere defined by four identical circular arcs connected to each other at points that lie on a great circle of the sphere. The four arcs are defined by the intersections of the sphere with two pairs of converging planes having each plane of one of the pairs orthogonal to each plane of the other pair. The two pairs of planes converge in opposite directions toward the axis perpendicular to and passing through the center of the great circle. Each of the four arcs are convex in the direction of convergence of the plane defining the arc. The segment of the conductor coils corresponding to one of the four arcs defines a lobe of the baseball seam magnet. One pair of opposing lobes forms a first lobe pair, and the other pair forms a second lobe pair.

The multiple conductor coils of the inventive baseball seam magnet define separate paths along the configuration, such that the interlobe coil separation distance, defined as the distance, measured perpendicular to the axis described above, between the centroid of the cross-sectional area of a conductor coil at the extremity of one lobe of a lobe pair and the centroid of the cross-sectional area of the same conductor coil at the extremity of the other lobe of the lobe pair, of at least one conductor coil in the first lobe pair is unequal to the interlobe coil separation distance of the same conductor coil in the second lobe pair. When more than one of the conductor coils, including at least one of the conductor coils having different interlobe coil separation distances, are energized to different levels, an asymmetrical "minimum-B magnetic field" is generated. The mirror ratio of the magnetic field is varied between upper and lower limits fixed by the magnet geometry by regulating the difference.

The inventive baseball seam magnet, hereinafter designated a "multi-coil baseball seam magnet," greatly surpasses the single coil baseball seam magnet as a confinement means for high temperature plasma. In the first place, the multi-coil baseball seam magnet is a more versatile magnet configuration than the single coil baseball seam magnet. One multi-coil baseball seal magnet affords a wide range of mirror ratios of the magnetic well, while the single coil baseball seam magnet provides a magnetic well with a mirror ratio fixed by the geometry of the magnet. In the second place, the asymmetrical magnetic field suppresses resonant-frequency plasma instabilities that can result when a single coil baseball seam magnet is used for confining high temperature plasma. At the same time, the multi-coil baseball seam magnet retains all of the characteristic advantages of the baseball seam configuration. The multi-coil baseball seam magnet is still a simple and efficient magnet that can produce a "minimum-B magnetic field." Also, it produces a magnetic field with a deep, large volume magnetic well, and the access to the interior of this well remains excellent.

BRIEF DESCRIPTION OF THE DRAWINGS

In the drawings wherein like reference characters denote like parts or geometrical properties in the several views:

FIG. 2 represents the magnetic field generated by the embodiment of FIG. 1 when the conductor coils carry 4,800,000 ampere-turns of electrical current;

FIG. 2a is a pictorial view of the embodiment of FIG. 1 showing the position of the $x$, $y$ and $z$ orthogonal axis system;

FIG. 5 depicts the magnetic field mirror contours generated by the embodiment of FIG. 1 when two different current distributions are passed through the conductor coils.

DESCRIPTION OF THE INVENTION

Figure 1:
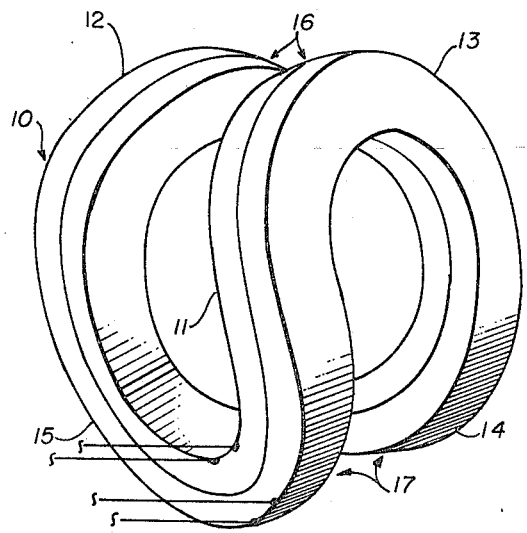
FIG. 1 is a three-dimensional view of an embodiment of the present invention comprised of two electrically independent, contiguous conductor coils.

Referring to FIG. 1, a three-dimensional view of an embodiment of the present invention is shown wherein two electrically independent, contiguous conductor coils, an outer coil 10 and an inner coil 11, conjointly define a configuration similar to the seam of a baseball. In particular, the configuration approximates a continuous line on the surface of a sphere defined by four identical circular arcs connected to each other at points that lie on a great circle of the sphere. The opposing pairs of arcs converge in opposite directions away from a plane containing the great circle of the sphere. Each of the arcs corresponds to a lobe of the magnet such that there are four identical lobes 12, 13, 14 and 15, wherein one pair of opposing lobes defines a first lobe pair 16, and the other pair of lobes defines a second lobe pair 17. The lobe angle is the minimum angle between a plane containing one of the lobes and the line perpendicular to and passing through the center of the great circle. FIG. 2 represents the "minimum-B magnetic field" generated by the two-coil, four-arc baseball seam magnet of FIG. 1 having the characteristics specified in Table I below. As a reference, the orthogonal axis system of FIG. 2a is shown in FIG. 2, wherein the $z$-axis is perpendicular to and passes through the center of the great circle of the sphere. The $x$-axis and the $y$-axis each lie in the plane of the great circle and pass equidistant from the points connecting the lobes of the magnet. The magnetic well of the magnetic field is the volume confined within the surface defined by the 40 kilogauss magnetic field contour, i.e., the mirror contour. The depth of the magnetic well is characterized by the mirror ratio, defined as the value of the field at the mirror contour divided by the minimum central field strength. The mirror ratio of the "minimum-B magnetic field" of FIG. 2 is two (2).

TABLE I

| | |
|---|---|
| Number of conductor coils | 2. |
| Conductor material | Nb-Ti superconductor alloy 36% Nb by wt. |
| Conductor dimension | .25 in. square. |
| Conductor turns per conductor coil | 1000. |
| Lobe angle | 10 degrees. |
| Average coil diameter (diameter of sphere) | 1.2 meters. |
| Ampere-turns per conductor coil | 2,400,000. |
| Central field | 20 kilogauss. |
| Mirror contour field | 40 kilogauss. |
| Mirror ratio | 2. |

Figure 3:
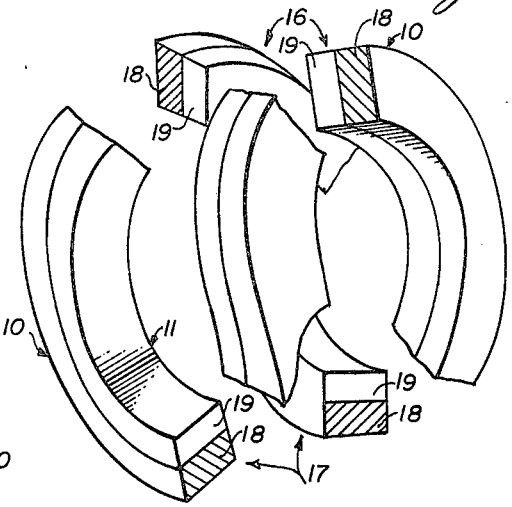
FIG. 3 is a cutaway view of the embodiment of FIG. 1 showing the cross-sections of the two conductor coils at the extremities of the first and second lobe pairs.

The mirror ratio of a baseball seam magnet is a function of the lobe separation distances of the first lobe pair and the second lobe pair. When the magnet is energized, the lobe separation distance of the first lobe pair is the distance between the combined current centroid of the conductor coils at the extremity of one of the lobes of the lobe pair and the combined current centroid of the conductor coils at the extremity of the other lobe of the pair. The lobe separation distance of the second lobe pair is the corresponding distance at the second lobe pair. FIG. 3 is a cutaway view of the four-arc, two-coil baseball seam magnet of FIG. 1, exposing the cross-sections of the two coils 10 and 11 at the extremities of the first and second lobe pairs 16 and 17. The outer conductor coil 10 and the inner conductor coil 11 are shown with equal rectangular cross-sectional areas 18 and 19. The asymmetry of the conductor coils 10 and 11 permits the location of the combined current centroid of the two conductor coils to be controlled by regulating the amount of current passing through each conductor coil, thereby permitting control of the mirror ratio of the "minimum-B magnetic field" generated by the magnet.

Figure 3A:
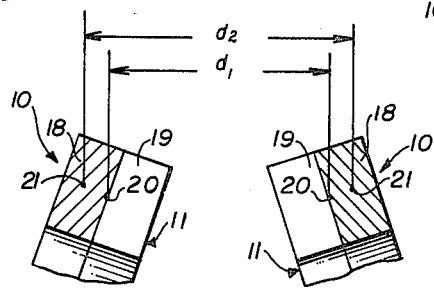
FIG. 3a is a partial view of FIG. 3, showing the cross-sections of the first lobe pair.
Figure 3B:
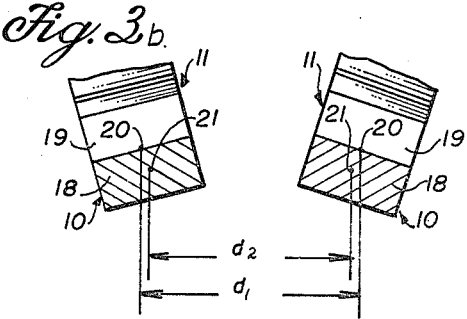
FIG. 3b is a partial view of FIG. 3, showing the cross-sections of the second lobe pair.
Figure 4:
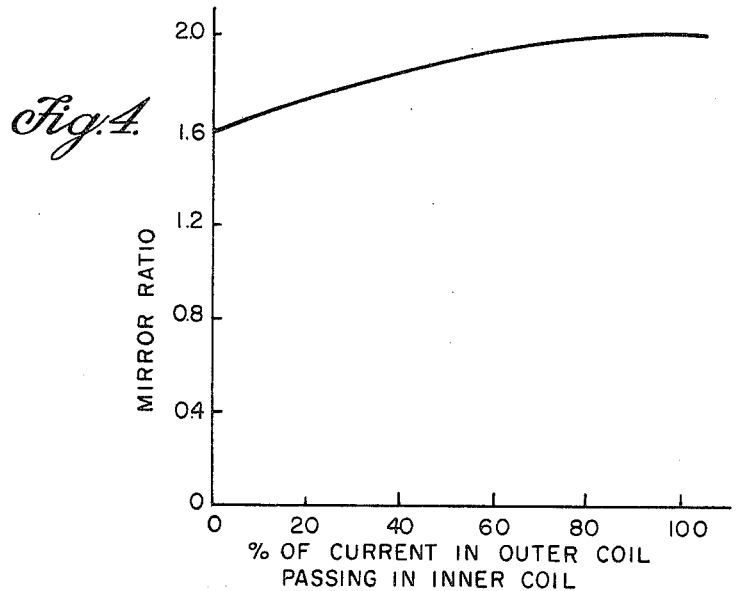
FIG. 4 is a graph of the mirror ratio of the magnetic field generated by the embodiment of FIG. 1 as a function of the percentage of the current passing in the outer coil that is passing through the inner coil.

As an example, consider the location of the combined current centroid in the following two cases: First, the outer and inner conductor coils 10 and 11 carrying an equal amount of current; and second, the outer coil 10 carrying all of the current. Referring to FIGS. 3a and 3b, the combined current centroid 20 for the first case above corresponds to the centroid of the combined cross-sectional areas of the outer and inner conductor coils 10 and 11, and, in the second case above, the combined current centroid 21 corresponds to the centroid of the cross-sectional area of the outer conductor coil 10 alone. The lobe separation distances, denoted by $d$, are also shown in FIGS. 3a and 3b. The subscripts 1 and 2 indicate the first and second cases above, respectively. It will be noted that in the first case, the lobe separation distance of the first lobe pair 16 is equal to the lobe separation distance of the second lobe pair 17, while in the second case the lobe separation distance of the first lobe pair 16 is larger than the lobe separation distance of the second lobe pair 17. As a result, the mirror ratio of the magnetic field generated by the four-arc, two-coil baseball seam magnet in the second case is lower than the mirror ratio in the first case. FIG. 4 gives the variation of the mirror ratio of the "minimum-B magnetic field" generated by the four-arc, two-coil baseball seam magnet of FIG. 1 when the current in the outer conductor coil 10 remains at a constant value and the current in the inner conductor coil 11 is decreased from that value. Similar but smaller decrease in the mirror ratio are produced when the current in the inner conductor coil 11 remains constant and the current in the outer conductor coil 10 is decreased.

The "minimum-B magnetic field" generated by a baseball seam magnet, either single or multi-coil, is characteristically asymmetrical about the $x$-axis and the $y$-axis, and symmetrical about the $z$-axis. In addition, the single coil baseball seam magnet generates a magnetic field with further symmetry. The magnetic field contours in the plane containing the $x$- and $z$-axis are a mirror image across the plane containing the $x$- and $y$-axis of the contours in the plane containing the $y$- and $z$-axis. This mirror symmetry permits a high temperature plasma contained in the magnetic field to exhibit resonant-frequency instabilities. However, when the lobe separation distance of the first and second lobe pairs of a multi-coil baseball seam magnet are not equal, this symmetry is destroyed and the resonant-frequency plasma instability is suppressed. FIG. 5 represents the magnetic field mirror contours generated by the four-arc, two-coil baseball seam magnet of FIG. 1 for the example above. As shown in FIG. 2, the mirror contours occur within the interior of the multi-coil baseball seam magnet. The mirror contours in the plane containing the $x$- and $z$-axis are designated by X, and the mirror contours in the plane containing the $y$- and $z$-axis are designated by Y. The subscripts 1 and 2 denote the first and second cases, respectively. In the second case where the lobe separation distance for the first lobe pair is not equal to the lobe separation distance for the second lobe pair, the magnetic field exhibits the additional asymmetry described above.

A multi-coil baseball seam magnet capable of generating an asymmetrical "minimum-B magnetic field" having a mirror ratio that can be varied is achieved, in accordance with the present invention, by specially disposing the conductor coils of the magnet so as to define separate paths along the baseball seam configuration such that the interlobe coil separation distance, defined as the distance, measured perpendicular to the $z$-axis, between the centroid of the cross-sectional area of a conductor coil at the extremity of one lobe of a lobe pair and the centroid of the cross-sectional area of the same conductor coil at the extremity of the other lobe of the lobe pair, of at least one conductor coil in the first lobe pair is unequal to the interlobe coil separation distance of the same conductor coil in the second lobe pair. When more than one of the conductor coils, including at least one of the conductor coils having different interlobe coil separation distances, are energized to different levels, the lobe separation distance of the first lobe pair is unequal to the lobe separation distance of the second lobe pair, and the magnet generates an asymmetrical magnetic field. The mirror ratio is variable, as described above, between an upper and lower limit fixed by the geometry of the multi-coil baseball seam magnet.

Figure 6:
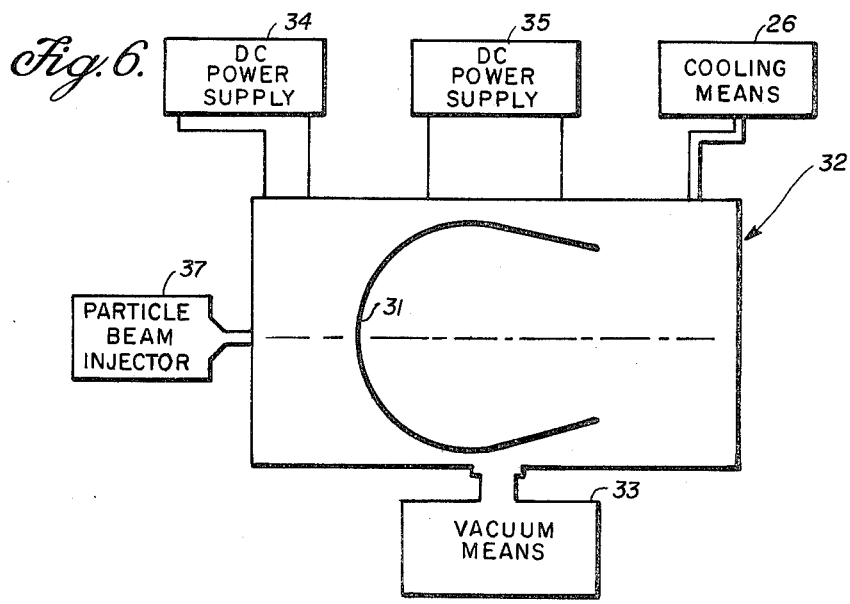
FIG. 6 is a schematic diagram of the embodiment of FIG. 1 employed with other equipment necessary to confine high temperature plasma.

The inventive multi-coil baseball seam magnet is used to confine high temperature plasma. One employment of the inventive magnet is presented schematically in FIG. 6. A two-coil baseball seam magnet 31 is positioned in a high vacuum chamber 32. The chamber is evacuated by a vacuum means 33. The two electrically independent conductor coils are separately energized by direct current power supplies 34 and 35 and are cooled by a coil-cooling means 26. A particle beam injector 37 injects excited neutral atoms toward the interior of the magnetic field. The neutral atoms are ionized by an interaction with the magnetic field, thereby releasing nuclei that are trapped in the magnetic well, forming a confined, high temperature plasma, typically one hundred million (100,000,000) degrees centigrade. When the confined plasma is retained in the magnetic well for a very short period of time, typically on the order of one-tenth (0.1) of a second, the nuclei undergo nuclear fusion, thereby releasing substantial amounts of energy useable to generate electrical power.

Although a specific embodiment of the multi-coil baseball seam magnet was described above, it will be obvious to those skilled in the art that variations and modifications are possible. In general, the design of the conductor coils involves consideration of many factors including performance, as well as manufacturing and operating costs of the baseball seam magnet. The conductor coils can be constructed of either conventional conductor materials, e.g., copper, or superconducting materials, e.g., niobium-titanium alloy having thirty-six (36) percent niobium by weight. If a high intensity magnetic field is required in the interior of a large baseball seam magnet, only short duration, transient magnetic fields can be generated with conventional conductor coils, since removal of all the joule heat generated in the coils is impractical. However, under the same conditions, superconductor coils can generate a steady-state magnetic field. The additional cost for the superconductor material over the conventional conductor material is more than offset by the reduced costs for the power supplies for the superconductor multi-coil baseball seam magnet.

In addition, it will be obvious to those skilled in the art that any plurality of electrically independent conductor coils, each comprising a fraction of the entire coil, will generate as asymmetric "minimum-B magnetc field," provided that, in accordance with the present invention, at least one of the conductor coils defines a separate path along the baseball seam configuration such that the interlobe coil separation distance of the conductor coil in the first lobe pair is unequal to the interlobe coil separation distance of the same conductor coil in the second lobe pair. As the number of conductor coils having unequal interlobe coil separation distances is increased, the range limits on the variable mirror ratio is correspondingly increased. Also, the independent conductor coils are not required to have equal cross-sectional areas, nor must the cross-sectional areas of the coils be rectangular in shape as shown in the embodiment of FIG. 1. In addition, the independent conductor coils can be comprised of as many as several hundred conductor turns, and each conductor turn can be electrically insulated from the adjacent conductor turns. As the number of insulated conductor turns per conductor coil is increased, the amount of direct current necessary to generate a given "minimum-B magnetic field" in the multi-coil baseball seam magnet interior is decreased.

It will also be apparent to those skilled in the art that numerous other variations and modifications may be made within the spirit and scope of the invention, and thus the discussion above is not intended to limit the invention except as defined in the following claims.

What is claimed is:

1. An electromagnet for confining high temperature plasma, comprised of at least two electrically independent, contiguous conductor coils conjointly defining a configuration approximating a continuous line on the surface of a sphere defined by four identical circular arcs connected to each other at points that lie on a great circle of said sphere, said arcs defined by the intersections of the sphere with two pairs of converging planes, each plane of one pair orthogonal to each plane of the other pair, the two pairs of planes converging in opposite directions toward the axis perpendicular to and passing through the center of the great circle, each said arc being convex in the direction of convergence of the plane defining said arc; said coils defining a first lobe pair and a second lobe pair, each said coil comprising a lobe pair having an interlobe coil separation distance defined by the centroids of the cross-sectional areas of said coil at the extremities of the lobes of the lobe pair, said contiguous conductor coils defining separate paths along said configuration establishing the interlobe coil separation distance of at least one said coil in the first lobe pair to be unequal to the interlobe coil separation distance of the same said coil in the second lobe pair.

2. The magnet of claim 1, further defined such that there are two said conductor coils.

3. The magnet of claim 2, further defined such that said two conductor coils have equal rectangular cross-sectional areas.

4. The magnet of claim 3, further defined such that said two conductor coils are comprised of as many as several hundred conductor turns.

5. The magnet of claim 4, further defined such that each said conductor turn is electrically insulated from adjacent conductor turns.

6. The magnet as defined in claim 5, wherein said two conductor coils are made of a superconducting material.

7. The magnet of claim 6, further defined such that said superconducting material is a niobium and titanium alloy having thirty-six percent niobium by weight.

References Cited

UNITED STATES PATENTS

| 3,309,638 | 3/1967 | Rausch et al. | 335—299 |
| 3,431,523 | 3/1969 | Donadieu | 335—210 |

BERNARD A. GILHEANY, Primary Examiner

R. N. ENVALL, JR., Assistant Examiner

U.S. Cl. X.R.

335—216; 336—225